Patented June 24, 1947

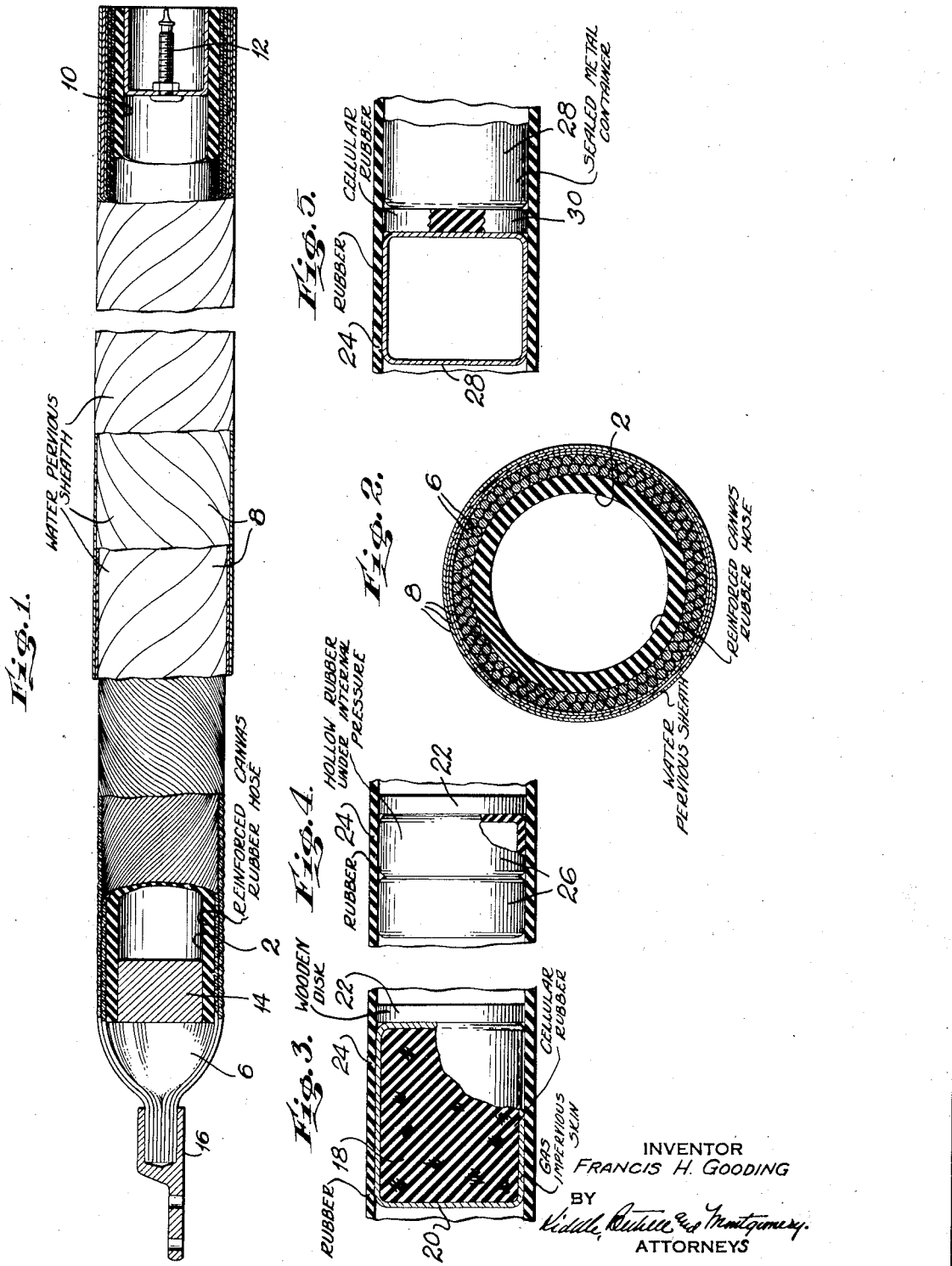

2,422,727

UNITED STATES PATENT OFFICE 2,422,727

BUOYANT ELECTRODE

Francis H. Gooding, Lodi, N. J., assignor to The Okonite-Callender Cable Company, Incorporated, Paterson, N. J., a corporation of New Jersey Application February 14, 1942, Serial No. 430,933

1 Claim. (Cl. 174—131)

This invention relates to an improvement in buoyant electrodes, more specifically to electrodes of any desired continuous length and adapted for use with so-called buoyant cables.

One of the objects of my invention is to provide an electrode in which the weight to volume ratio will be such that the electrode is capable of floating in water, the electrode being so constructed that the corrosive action of the sea-water, for instance, in which the electrode is to be floated, is very much reduced.

More specifically my invention provides an electrode of the general character above referred to in which a plurality of bare aluminum wires constituting the conductor of the electrode are wrapped in layers about a buoyant center, the wires or strands of one layer being laid up oppositely to the wires or strands of the overlying layer, the assembly thus provided being encased in a sheath or sheaths of a braid which may be made of linen, for instance, nylon or other suitable water pervious material, thereby providing a conducting path from the electrode conductor to the medium in which the electrode is floated, such as sea-water, for instance. I have discovered that with such a construction there is a decided reduction in corrosion of the wires or strands constituting the conductor of the electrode as compared with a bare copper wire laid up about a buoyant center as practiced heretofore.

The accompanying drawing shows several embodiments of my invention:

Fig. 1 is a part sectional elevational view of one embodiment of my invention;

Fig. 2 is a cross section of the electrode of Fig. 1;

Figs. 3, 4 and 5 are fragmentary views of various types of center I may employ.

Referring to the drawing in detail and first of all to Figs. 1 and 2: 2 designates the core or center of my improved electrode. As illustrated, this core or center is composed of a reinforced canvas rubber hose. Laid up about this tubular member are bare aluminum wires or strands 6. These wires or strands, which constitute the conductor of the electrode, are laid in layers about the center 2, the wires or strands, as shown in Fig. 1, of one layer being laid up oppositely to those of the overlying layer. About these wires or strands I apply one or more sheaths 8 preferably in the form of a water pervious braid composed of linen, nylon or other similar material.

The outer end of the center 2 is hermetically sealed, as shown at 10, and equipped with a valve 12. The inner end of the center is also sealed as shown at 14 so that the center 2 is watertight from end to end. The function of the valve 12 is to permit the center to be placed under slight internal pressure, for example fifteen pounds to the square inch, to build up the resistance of the center to crushing from externally applied pressure. As an alternative the center 2 may be simply a self-sustaining rubber hose, in which event, of course, the valve 12 is omitted.

To adapt the electrode for attachment to a cable, the conductor strands 6 may be bared for a short distance and pressed into a metal lug 16, and then wrapped with tape.

As above pointed out, in my improved electrode it is to be understood that the weight to volume ratio is such that the electrode may be floated in sea-water or other desired medium.

While I have described a specific form of buoyant center which may constitute a part of my electrode, it is to be understood that other types of buoyant center may be employed, if desired. For example, in Fig. 3 I show a buoyant center comprising a plurality of cellular rubber members 18 each of which may or may not be individually enclosed in a relatively gas impervious skin 20, so that any gas escaping from the cellular rubber members will be retained. Intermediate the cellular rubber members 18 are wooden discs 22. The cellular members and wooden discs constituting the center are enclosed in a sheath 24 of rubber or other water impervious material.

In Fig. 4 I illustrate a center comprising hollow rubber balls 26, which may be under internal pressure. These balls are interspersed with wooden discs 22, and the whole enclosed in a sheath 24 of rubber or other water impervious material.

In Fig. 5 I show a center comprising hollow hermetically sealed metal members 28, intercalated with hollow or cellular rubber discs 30, the assembly being enclosed in a water impervious sheath 24.

It is to be understood that changes may be made in the details of construction above described within the purview of my invention.

What I claim is:

A buoyant electrode comprising a buoyant center of cellular rubber members intercalated with wooden discs, bare wires or strands constituting the electrode conductor laid up in oppositely extending layers about said center, and a water pervious non-metallic fabric sheath about said wires or strands, the weight to volume ratio of the electrode being such as to render the electrode buoyant in sea water, said sheath protecting said electrode against metal loss due to electrolytic corrosion when an electric current is passed through the water in which the electrode is floating to a companion electrode.

FRANCIS H. GOODING.

REFERENCES CITED

The following references are of record in the file of this patent:

UNITED STATES PATENTS

| Number | Name | Date |
|---|---|---|
| 1,667,510 | Coe | Apr. 24, 1928 |
| 213,458 | Shuster | Mar. 18, 1879 |